Feb. 24, 1959     L. G. BERQUIST     2,874,411
APPARATUS FOR COATING AND IMPREGNATING TUBULAR FABRICS
Filed Aug. 10, 1956     2 Sheets-Sheet 1

INVENTOR.
LEONARD G. BERQUIST
BY
ATTORNEYS

Feb. 24, 1959 L. G. BERQUIST 2,874,411
APPARATUS FOR COATING AND IMPREGNATING TUBULAR FABRICS
Filed Aug. 10, 1956 2 Sheets-Sheet 2
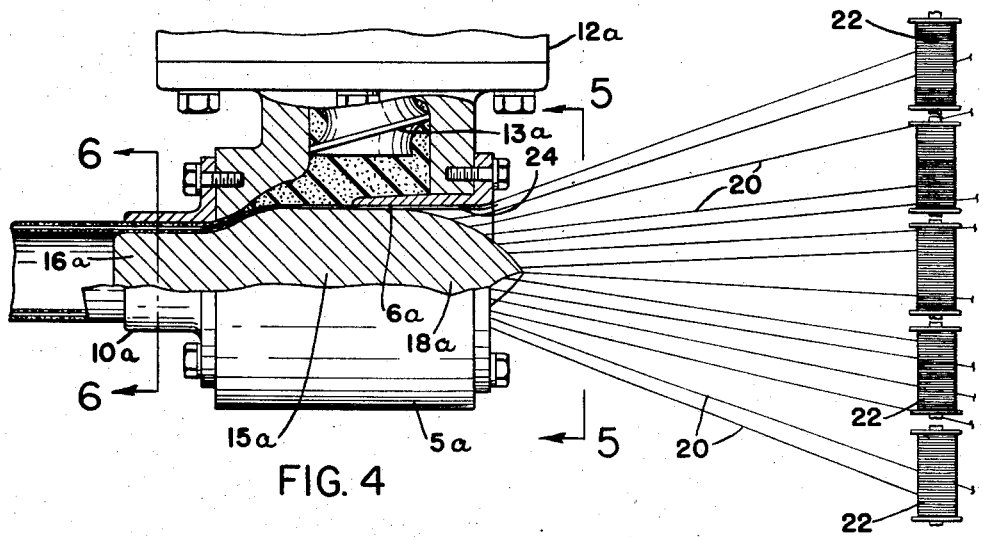
FIG. 4
FIG. 5
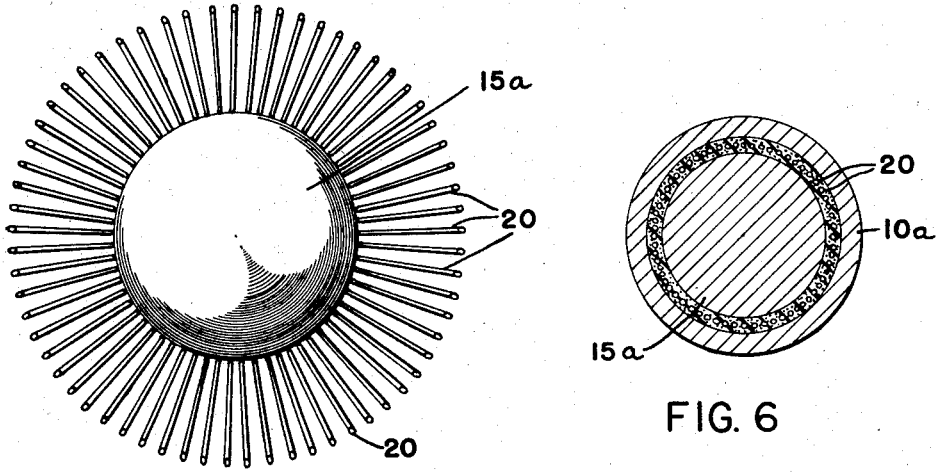
FIG. 6
INVENTOR.
LEONARD G. BERQUIST
BY *Ely, Frye & Hamilton*
ATTORNEYS

United States Patent Office 2,874,411
Patented Feb. 24, 1959

2,874,411

APPARATUS FOR COATING AND IMPREGNATING TUBULAR FABRICS

Leonard G. Berquist, Niles, Mich., assignor to National-Standard Company, Niles, Mich., a corporation of Delaware Application August 10, 1956, Serial No. 603,279

5 Claims. (Cl. 18—13)

The present invention is designed primarily for the purpose of rubber coating and impregnating tubular fabrics which are adapted and intended for the manufacture of pneumatic tires. However, the use of the invention is not so restricted and it may be used in the coating and impregnating other tubular or cylindrical bodies and it will therefore be understood that this invention is not to be limited to the tire building art, nor is it limited to the use of rubber, as other plastic materials may be used.

The method of manufacturing pneumatic tires from tubular fabrics is covered in applicant's copending application Serial No. 604,880 filed August 20, 1956, to which reference may be made.

In one form of the invention the tubular fabric is a braided structure which may be made from a multiplicity of strands upon a conventional braiding machine such as is well known in the arts. In another form of the invention the tubular structure is composed of longitudinal strands which are parallel or substantially parallel to the axis of the tubular body.

The strands which are preferably employed in tubular fabrics for the manufacture of pneumatic tires may be individual steel wires which are brass plated or otherwise treated with well known agents, to promote the bonding of the vulcanized rubber to the wires; or the strands may be cables or bundles of very fine wires treated in the same manner. Alternatively, rayon, nylon or cotton cords or other textile materials may be employed.

The object and purpose of the present invention is to devise an apparatus by which the cylindrical tubular structure made from any of the above materials and either by braiding or by laying the strands parallel to one another in cylindrical form, may be thoroughly and effectively coated and impregnated with rubber or plastic compositions. It is essential that the prefabricated cylinder of strands be thoroughly coated with the plastic and that the plastic be forced into the strucure and around all the strands thereof so that each strand shall be fully encased and separated from every other strand by a thickness of the plastic material.

The apparatus shown and described herein accomplishes the purposes set forth, whether the braided or parallel-strand type of tubular structure is to be treated. It is essential, particularly with the braided type for tires, that the plastic or rubber-like material shall penetrate the structure of the body and be forced between the overlying strands so that they are completely insulated from one another and thus the friction generated in the use of the tire shall be kept at a minimum. With the parallel cords or strands the rubber should be of sufficient thickness and strength so that it holds the strands in cylindrical form during subsequent handling.

For either of the above purposes, the rubber must be forced into the tubular structure under considerable pressure and therefore the tubular structure must be supported from the inside while being treated. An adequate support on the inside of the structure will insure that the rubber thoroughly penetrates the tubular structure.

In the drawings, two forms of the invention are shown, each adapted to its particular problems, but it will be understood that it is not intended that the invention shall be limited to the details of structure disclosed herein, for the invention is subject to changes and modifications within the scope thereof, as set forth in the claims. It is also possible that the cords or strands be spirally arranged.

In the drawings:

Fig. 4 is a cross sectional view through a typical die head, especially adapted for the parallel strand form of tubular structure.

Fig. 5 is a section on the line 5—5 of Fig. 4.

Fig. 6 is a section on the line 6—6 of Fig. 4.

Figure 1:
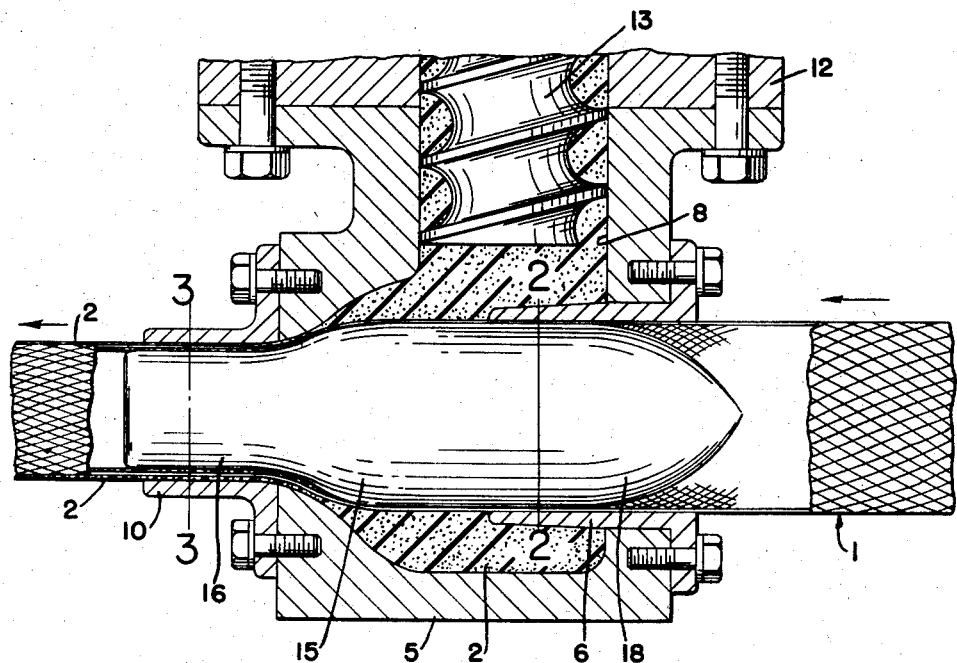
Fig. 1 is a cross sectional view through a typical die head which is especially adapted for the braided type of structure.
Figure 2:
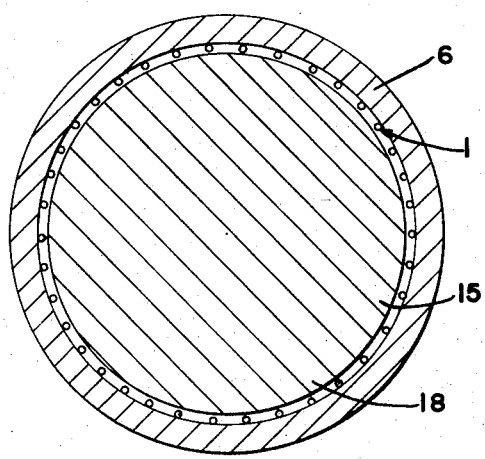
Fig. 2 is a section on the line 2—2 of Fig. 1.
Figure 3:
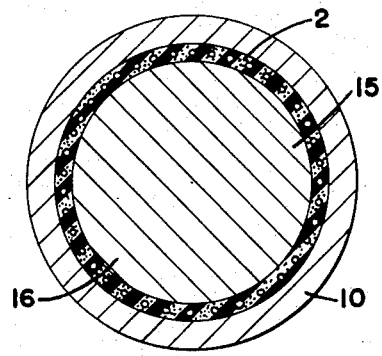
Fig. 3 is a section on the line 3—3 of Fig. 1.

Referring to Figs. 1, 2 and 3, a braided tubular structure such as is intended to be rubber coated and impregnated is indicated at 1, as it enters the die head. This structure may or may not come directly from the braiding machine. As shown, the strands are open and are interlaced so that the several strands pass over and under each other in spiral paths. As it issues on the opposite side of the die head, the diameter of the cylinder has been reduced and the bare wires are fully impregnated and covered with a plastic or rubber-like stock 2. The attenuation of the structure has been accompanied with a change in the angle which each strand makes with a plane transverse the axis of the structure.

The uncoated tube enters the die head which is marked 5, through a guiding sleeve 6 bolted thereto, which forms an annular aperture sufficiently larger than the diameter of the tube, so as to permit the free passage of the tube into the head. The sleeve 6 extends into the chamber 8 in the die.

At the outlet end of the die head is a second sleeve 10 which is bolted to the head and which is somewhat less in diameter than the sleeve 6. The walls of the chamber converge to the opening formed by the sleeve 10 so that the material in the chamber is forced into and around the tubular structure.

The head is bolted to the discharge end of an extruding or tubing machine indicated at 12, in which there is a feed screw 13 which forces the plastic into the chamber 8 and maintains it under substantial pressure so that it is constantly being forced into the interstices of the tube 1.

In order to prevent the tube from collapsing under the pressure of the plastic, and also to afford a backing which will cause the rubber to penetrate the tube 1, there is located in the tube what may be termed a floating or slidable mandrel 15 which is inserted in the tube 1 before it is started through the die head. This is a cartridge shaped body having a leading end or snout 16, which fits within the sleeve 10 by which it is held and supported. There is sufficient clearance between the outer surface of the snout 16 and the inner surface of the sleeve 10 so as to accommodate the contracted tube 1 and the inner and outer layers of rubber with which it is encased. The opposite end 18 of the mandrel 15 is enlarged and fits in and is supported by the sleeve 6, with sufficient clearance so as to pass the uncoated strands. Because the mandrel is a slidable or "floating" mandrel, in the sense that it is supported by the strands which surround it, the length of the tubular structure may be extended indefinitely. Further, the mandrel seeks its own location in the outlet and at the center of the tubular structure, and consequently the layer of rubber over the strands is uniform.

It will be seen that in the use of this apparatus, rubber or other plastic will be forced to penetrate every interstice of the tube and also to coat the tube so that each strand is coated and insulated from its neighbors. The tubular body may be propelled solely by the force of the material issuing from the die, or a drawing means may be employed for aiding in the propulsion of the tube.

In the form of the invention shown in Figs. 4, 5 and 6, like parts of the die are given like numbers with the letter "a" added thereto.

In this form, the individual strands which are indicated at 20, come from a bank of spools 22 arranged in circular form. Only a few of these strands are shown at the right of Fig. 4. These strands pass into an annular guiding aperture 24 at the intake end of the die head and pass out through an annular aperture in the exit sleeve 10a. A similar mandrel 18a supports the strands and causes the plastic and the strands to form a tubular structure in which the strands are parallel and held in tubular form by the plastic which surrounds and encases them.

Either form of the invention, as well as modifications thereof, will produce an elongated tubular body having reinforcing strands of wire, wire cables, tape or textile cords thoroughly impregnated with rubber or like plastic material and separated and insulated from one another by the material. Such a tubular structure may be subdivided into bands which are useable in the manufacture of pneumatic tires or may be used for other purposes.

Where the term "strands" is used in the specification and claims it is intended to cover all types which have been referred to. The invention is applicable for the impregnation of cylinders made from those strands by rubber or any other plastic material which is capable of extrusion by the apparatus shown. While the body may be and preferably is, cylindrical the invention may be applied to the manufacture of hollow bodies of various cross sections, appropriate changes in the shape of the dies being all that is required. Where the word "cylinder" is used in the specification and claims, it is intended to cover other hollow bodies which are not truly cylindrical.

What is claimed is:

1. An apparatus for coating and impregnating an elongated hollow body composed of spaced reinforcing strands with a plastic material, a die head having a chamber, means to maintain a body of plastic material under pressure in the chamber while the reinforcing strands are passing through the chamber, said chamber having a guiding opening at one side thereof to receive the uncoated body and a die opening at the other side of the chamber through which the coated and impregnated body passes out of the chamber, and a mandrel surrounded by the body and having its leading end located in the die opening and its trailing end located in the guiding opening, said mandrel being free to move with the hollow body but held within the chamber by the die opening.

2. An apparatus for coating and impregnating an elongated hollow body composed of spaced reinforcing strands with a plastic material, a die head having a chamber, means to maintain a body of plastic material under pressure in the chamber while the reinforcing strands are passing through the chamber, said chamber having a guiding opening at one side thereof to receive the uncoated body and a die opening at the other side of the chamber through which the coated and impregnated body passes out of the chamber, and a mandrel surrounded by the body and having a tapered leading end located in the die opening, said die opening having an internal diameter less than the outer diameter of the main body of the mandrel, the main body of the mandrel having an outer diameter such as to support the strands against the pressure of the plastic material and the trailing end of the mandrel being located in the guiding opening and having sufficient clearance with the guiding opening to allow passage of the strands.

3. An apparatus for coating and impregnating an elongated hollow body composed of spaced reinforcing strands with a plastic material, a die head having a chamber, means to maintain a body of plastic material under pressure in the chamber while the reinforcing strands are passing through the chamber, said chamber having a guiding opening at one side thereof to receive the uncoated body and a die opening at the other side of the chamber through which the coated and impregnated body passes out of the chamber, and a mandrel surrounded by the body and having a tapered leading end located in the die opening, said die opening having an internal diameter less than the outer diameter of the main body of the mandrel, the main body of the mandrel having an outer diameter such as to support the strands against the pressure of the plastic material and the trailing end of the mandrel being located in the guiding opening and having sufficient clearance with the guiding opening to allow passage of the strands, said mandrel being free to move with the hollow body but held within the chamber by the die opening.

4. An apparatus for coating and impregnating an elongated hollow body composed of spaced reinforcing strands with a plastic material, a die head having a chamber, means to maintain a body of plastic material under pressure in the chamber while the reinforcing strands are passing through the chamber, said chamber having a guiding opening at one side thereof to receive the uncoated body and a die opening at the other side of the chamber through which the coated and impregnated body passes out of the chamber, and a mandrel surrounded by the body and having its leading end located in the die opening, said mandrel having its trailing end slidable in the guiding opening with sufficient clearance to pass the uncoated body, said mandrel being free to move with the hollow body but held with its leading end in the die opening and spaced from the die opening sufficiently to allow the passage of the coated and impregnated body out of the chamber.

5. An apparatus for coating and impregnating an elongated hollow body composed of spaced reinforcing strands with a plastic material, a die head having a chamber, means to maintain a body of plastic material under pressure in the chamber while the reinforcing strands are passing through the chamber, said chamber having a guiding opening at one side thereof to receive the uncoated body and a die opening at the other side of the chamber through which the coated and impregnated body passes out of the chamber, and a mandrel surounded by the body and having its leading end located in the die opening, said mandrel having its trailing end slidable in the guiding opening with sufficient clearance to pass the uncoated body, said mandrel being free to move with the hollow body but held with its leading end in the die opening and spaced from the die opening sufficiently to allow the passage of the coated and impregnated body out of the chamber, the leading end of the mandrel being tapered and the interior diameter of the die opening being less than the diameter of the main body of the mandrel.

References Cited in the file of this patent

UNITED STATES PATENTS

| 2,698,965 | Radtke | Jan. 11, 1955 |
| 2,767,431 | De Laubarede | Oct. 23, 1956 |

FOREIGN PATENTS

| 639,538 | Great Britain | June 28, 1950 |